(No Model.)
S. C. PALMER.
MACHINE FOR STICKING AND SCALDING NAPS TO FELT HATS.
No. 260,603. Patented July 4, 1882.
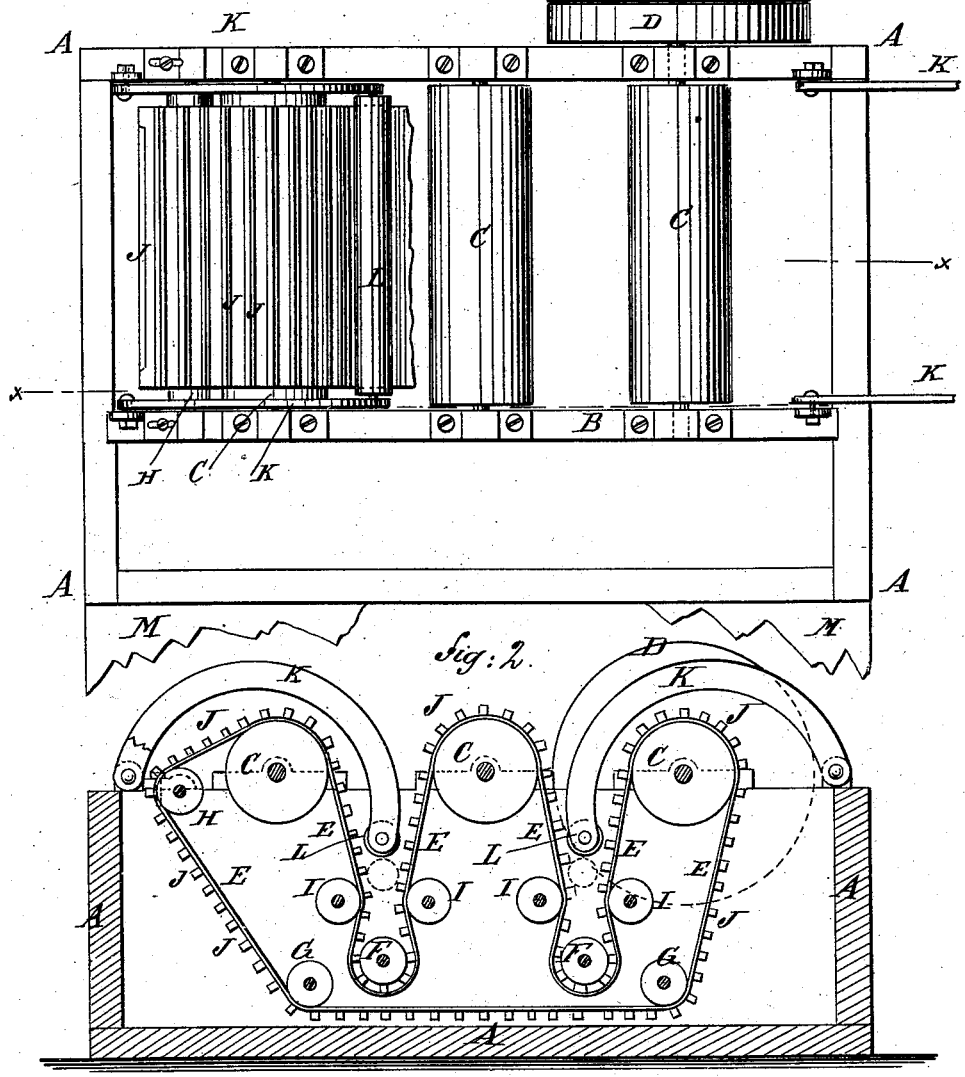
WITNESSES:
INVENTOR:
S. C. Palmer
BY
ATTORNEYS.

UNITED STATES PATENT OFFICE.

SEYMOUR C. PALMER, OF SOUTH NORWALK, CONNECTICUT, ASSIGNOR TO ELLEN M. PALMER, OF SAME PLACE.

MACHINE FOR STICKING AND SCALDING NAPS TO FELT HATS.

SPECIFICATION forming part of Letters Patent No. 260,603, dated July 4, 1882.

Application filed May 8, 1882. (No model.)

*To all whom it may concern:*

Be it known that I, SEYMOUR C. PALMER, of South Norwalk, in the county of Fairfield and State of Connecticut, have invented certain new and useful Improvements in Machines for Sticking and Scalding Naps to Felt Hats, of which the following is a full, clear, and exact description.

Reference is to be had to the accompanying drawings, forming part of this specification, in which similar letters of reference indicate corresponding parts in all the figures.

Figure 1 is a plan view of my improvement, parts being broken away. Fig. 2 is a sectional side elevation of the same, taken through the line $x\ x$, Fig. 1. Fig. 3 is a sectional end elevation of the same. Fig. 4 is a face view of a part of a cross-bar of the endless belt. Fig. 5 is a cross-section of the same, taken through the line $y\ y$, Fig. 4.

The object of this invention is to produce machines constructed in such a manner as to successfully accomplish the sticking and scalding of naps to felt hats.

The invention consists in a machine for sticking and scalding naps to felt hats, constructed with a vat divided into two compartments by a partition, and provided with three large cylinders, and two smaller cylinders placed between the centers of the spaces between the larger cylinders to form loops in the endless belt that passes around the said cylinders, and is provided with cross-cleats to operate upon the hat-rolls.

The machine is also provided with guide-rollers to keep the endless belt in proper position, and with pairs of guide-rollers to contract the loops of the endless belt.

The machine is also provided with rollers pivoted to curved hinged arms to rest upon the hat-rolls and apply the necessary pressure, as will be hereinafter fully described.

A represents a vat, which is divided longitudinally into two compartments by a partition, B, extending from the top of the said vat nearly to the bottom, thus leaving a free communication between the said compartments.

In bearings attached to the upper edges of the side and partition of the vat A revolve the journals of three cylinders, C, to a journal of one of which are attached pulleys D, to receive a driving-belt from any convenient power.

E is an endless belt, which passes over the three cylinders C and under two smaller cylinders, F, journaled to the lower parts of the side and partition of the vat A, beneath the centers of the spaces between the cylinders C. The belt E passes around two guide-rollers, G, pivoted to the side and partition of the vat A at a little distance below and at the outer sides of the small cylinders F, to keep the return part of the said belt out of contact with the part passing around the said cylinders F. The belt E also passes around a roller, H, pivoted to bearings attached to the upper edges of the side and partition of the vat A at the outer side of one of the outer cylinders C. The bearings of the roller H are movable, so that the said roller H can be adjusted to tighten or slacken the belt E. With this construction the small cylinders F form loops in the endless belt E, the sides of which, at points a little above said cylinders F, are drawn toward each other by pairs of guide-rollers I, pivoted to the side and partition of the vat A, and between which the said parts of the belt pass, thus forming tapering spaces between the parts of the belt E above the said guide-rollers I.

To the face of the belt E are attached cross-bars or cleats J, the ends of which are made square, and the sides of which are beveled, as shown in Figs. 4 and 5.

To studs attached to the end parts of the side and partition of the vat A are hinged pairs of curved arms K. To and between the forward ends of the arms of each pair is pivoted a small roller, L. The rollers L are made of such a size as to enter the tapering spaces in the loops of the belt E, and the curved arms K are made of such a length and curvature that the rollers L can be readily swung into and out of the said spaces.

To the side of the vat A, adjacent to the smaller compartment, is attached an apron, M, for the convenience of the workman in rolling up the hats, and which is made inclined, so that the water from said hats will flow back into the vat.

In applying my invention the machine is set in motion, the rollers L are swung back, the hats are rolled together, and the roll is placed in the angular space in a loop of the belt E. The roller L is then swung forward to rest upon the rolled-up hats. As the endless belt E moves forward the cleats J strike the opposite sides of the hat-roll successively and press the parts of the roll with which they come in contact inward, and at the same time turn the roll, so that the contact each time will be made in a different place, while the weight of the roller L holds the hat-roll down in its place with the necessary pressure, the effect upon the hat being the same as in hand sticking and scalding.

In using the machine the workman prepares a roll and places it in one loop of the belt E, then prepares a second roll and places it in the other loop of the belt E, and then prepares a third roll and puts it in the place of the first roll, which he rerolls, and puts it in the place of the second roll. He then rerolls the second roll and puts it in the place of the third roll, and so on, the machine operating upon two rolls while the workman is rerolling the third roll, each roll thus remaining in the machine undisturbed during the time required to reroll two rolls.

Having thus fully described my invention, I claim as new and desire to secure by Letters Patent—

1. A machine for sticking and scalding naps to felt hats, constructed substantially as herein shown and described, and consisting of the vat A, having partition B, the three large cylinders C, the two small cylinders F, the endless belt E, having cross-cleats J, the guide-rollers G H I, and the pressure-rollers L, and their hinged curved arms K, as set forth.

2. In a machine for sticking and scalding naps to felt hats, the combination, with the vat A, the rollers C, and the endless belt E, having cross-cleats J, of the smaller cylinders F, placed beneath the spaces between the cylinders C, and the guide-rollers G H, substantially as herein shown and described, whereby tapering loops will be formed in the endless belt to receive the hat-rolls, as set forth.

3. In a machine for sticking and scalding naps to felt hats, the combination, with the vat A, the cylinders C, the smaller cylinders F, placed beneath the center of the spaces between the cylinders C, and the endless belt E, having cross-cleats J, of the pairs of guide-rollers I, substantially as herein shown and described, whereby the loops of the said belt are contracted, as set forth.

4. In a machine for sticking and scalding naps to felt hats, the combination, with the vat A, the cylinders C, the smaller cylinders F, placed beneath the centers of the spaces between the said cylinders C, and the endless belt E, having cross-cleats J, of the pressure-rollers L and their hinged curved arms K, substantially as herein shown and described, whereby pressure will be applied to the hat-rolls while being operated upon by the cleats of the endless belt, as set forth.

SEYMOUR C. PALMER.

Witnesses:
JAMES T. GRAHAM,
C. SEDGWICK.